Patented July 6, 1948

2,444,784

UNITED STATES PATENT OFFICE 2,444,784

METHOD OF PREPARATION OF ALKYLATED SILANES

Robert N. Meals, Memphis, Tenn., assignor to General Electric Company, a corporation of New York No Drawing. Application March 1, 1946, Serial No. 651,421

9 Claims. (Cl. 260—448.2)

This invention relates to methods of preparing organo-silicon compounds. Generally, the invention is concerned with a process which comprises effecting reaction between (1) a compound represented by the formula LiR and (2) a compound of the general formula $(R')_n SiH_{(4-n)}$ where R and R' are each a monovalent hydrocarbon radical, specifically a hydrocarbon radical selected from the class consisting of alkyl, aryl, alkaryl and aralkyl radicals, and $n$ is an integer which is at least 1 and not more than 3.

More particularly, the invention relates to a method of preparing hydrocarbon-substituted silanes of the general formula

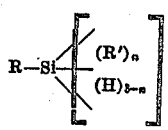

which comprises effecting reaction between (1) a compound of the general formula LiR and (2) a compound represented by the general formula $(R')_n SiH_{(4-n)}$, where R, R' and $n$ each has the meaning stated above, said reaction being effected in a suitable liquid medium which does not inhibit the reaction. Generally, I prefer to use polar liquid media for effecting reaction between the ingredients.

One of the objects of my invention is to provide a method whereby silicon compounds having a hydrogen attached to the silicon atom may have an alkyl, aryl, alkaryl, or aralkyl radical substituted for the hydrogen by means of the inter-reaction of a hydrocarbon-substituted alkali-metal compound, specifically a lithium compound consisting of lithium and an alkyl, aryl, alkaryl or aralkyl group attached thereto, and the hydrogen-containing hydrocarbon-substituted silicon compound.

Prior investigators have suggested that hydrocarbon-substituted lithiums may be caused to react with compounds of the general formula $X_{(4-n)}SiY_n$, where X is an organic radical, Y represents a member of the group consisting of halogens and alkoxy radicals and $n$ represents an integer from 1 to 4, in order to replace the halogen or alkoxy radical with the hydrocarbon substituted on the lithium. My invention differs from the above-described method in that I am able to replace a hydrogen on a hydrocarbon-substituted silane, said hydrogen being attached to the silicon atom, with a hydrocarbon by effecting reaction between a hydrocarbon-substituted lithium and the hydrocarbon-substituted hydrogen-containing silane.

In the more specific embodiments of my invention, I prefer to use as the liquid media in which the reaction may be effected straight chain lower alkyl liquid ethers, especially those boiling below about 150° C., for example, diethyl ether. The amount of the liquid medium employed in the reaction mixture may be varied depending, for instance, on the amount and type of hydrocarbon-substituted lithium, the solubility of said compound in the liquid medium, etc. Generally, by weight, for each part of the hydrocarbon-substituted lithium, from two to about thirty or more parts of the liquid medium may be employed.

The hydrocarbon-substituted lithium may be in the form of the isolated compound or in solution, for example, in an ether solution. When using the isolated hydrocarbon-substituted lithium, it may be dissolved or suspended in one of the aforementioned liquid media and the silane added to the resulting liquid mixture or solution.

Illustrative examples of the various radicals which R and R' in the above formulas may represent are: alkyl, e. g., methyl, ethyl, propyl, butyl, amyl, isopropyl, isobutyl, isoamyl, etc.; aryl, e. g., phenyl, naphthyl, etc.; alkaryl, e. g., tolyl, xylyl, ethylphenyl, propylphenyl, etc.; aralkyl, e. g., benzyl, phenylethyl, phenylpropyl, etc.

The reaction with which the present invention is concerned may be effected in various ways, for example, by causing the hydrocarbon-substituted hydrogen-containing silane, hereafter for purposes of brevity referred to as the "silane," to react with the hydrocarbon-substituted lithium in the presence of a suitable liquid medium, for instance, such media as straight chain lower alkyl ethers, e. g., diethyl ether, di-(n-propyl) ether, di-(n-butyl) ether, ethyl n-propyl ether, n-propyl n-butyl ether, etc.; other types of ethers, e. g., diethyl ether of diethylene glycol, dioxane, etc.; trialkyl-substituted amines, e. g., triethyl amine, tripropyl amine, diethyl N-methyl amine, etc. Mixtures of the foregoing liquid media as well as other suitable liquid media also may be employed. With certain liquid organic solvents or diluents, specifically benzene and low boiling petroleum fractions, no apparent reaction takes place when effort is made to react the hydrocarbon-substituted lithium with the silane in the presence of such liquid media.

It is desirable that the reaction mixture be protected from moisture and from the oxidizing effects of the atmosphere during the course of the reaction. The solution is preferably stirred vigorously during the addition of the silane and during the course of the reaction, which reaction may require from approximately one to thirty or more hours for completion. Heat may be applied to the reaction mixture to effect gentle refluxing of the mixture, the reflux temperature of the mass, depending mainly on the liquid medium, the silane and the hydrocarbon-substituted lithium employed. Lower temperatures also may be used in effecting reaction, e. g., temperatures of the order of from slightly above normal temperatures (25–30° C.) up to the reflux temperature of the reaction mass.

The lithium hydride which results from the reaction may be removed by filtration or may be converted to the lithium hydroxide by the addition of water to the reaction mixture, and the resulting aqueous layer is then separated from the ether layer. The remaining ether solution is preferably washed with water, dried and fractionally distilled to recover the desired products.

Various methods, well-known in the art, may be employed to prepare the hydrocarbon-substituted lithium compounds used in practicing this invention. Erich Krause and Aristid von Grosse, in their book entitled "Die Chemie der Metall-Organischen Verbindungen" (published by Gebrüder Borntraeger of Berlin in 1937) disclose specific methods for the preparation of various hydrocarbon-substituted lithiums. These compounds may be isolated prior to being reacted with the silane, or they may be employed in the form of the solution in which the compound was prepared, provided the solvent component thereof comprises one of the liquid media suitable for the reaction between the silane and the hydrocarbon-substituted alkali metal.

The hydrocarbon-substituted hydrogen-containing silanes may be prepared by various methods, for instance, in accordance with the method shown by Ladenburg in Ann., 164, 300 (1872). Another method for making the silanes, specifically the triethylsilane used in the following examples, comprises adding ethyldichlorosilane to an excess of the required amount of ethylmagnesium chloride. Ethyldichlorosilane may be obtained, for example, as one of the products of reaction between ethyl chloride and silicon in the presence of copper, this general reaction being disclosed in, for instance, Rochow U. S. Patent No. 2,380,995, which is assigned to the same assignee as the present invention.

The following examples are intended to illustrate and not limit the manner in which the present invention may be practiced. All parts are by weight.

*Example 1*

|  | Parts | Approx. Mol Ratio |
|---|---|---|
| Triethylsilane [1] ($C_2H_5$)$_3$SiH | 113 | 1.2 |
| n-Propyllithium (in about 900 parts diethyl ether) | 40 | 1.0 |

[1] Triethylsilane boils at 109° C. at 755 mm.

The above ingredients were mixed together and heated at the reflux temperature of the mass for 22 hours. Throughout the reaction the mixture was stirred vigorously and a nitrogen atmosphere was maintained over the reaction mass. The precipitate comprising lithium hydride which formed during the reaction was removed by filtration. Five hundred parts water were added to the reaction mixture and the aqueous layer was separated from the ether layer. The ether layer was washed twice with 500 parts water and dried over anhydrous sodium sulfate. The ether was removed by distillation and the resulting liquid was fractionally distilled to obtain 97 parts (approximately 75% of the theoretical yield) of triethylpropylsilane boiling at 169.8° C. at 752 mm. and having a density and refractive index at about 25° C. of 0.809 and 1.4247, respectively.

*Example 2*

|  | Parts | Approx. Mol Ratio |
|---|---|---|
| Triethylsilane | 151 | 1 |
| n-Butyllithium (in 1430 parts diethyl ether) | 83 | 1 |

The above ingredients were reacted in the same manner as the ingredients in Example 1 with the exception that the reflux period was for 23 hours instead of 22 hours as in the foregoing example. The precipitate comprising lithium hydride which formed during the reaction was removed by filtration. About 750 parts water were added to the reaction mixture and the aqueous layer was separated from the ether layer. The ether layer was washed twice with 250 parts water and dried over anhydrous sodium sulfate. The ether was removed by distillation and the remaining liquid was fractionally distilled to obtain 130 parts (approximately 58% of the theoretical yield) of triethylbutylsilane boiling at 191.2° C. at 758 mm. and having a density and refractive index, at 28.8° C., of 0.780 and 1.4322, respectively.

*Example 3*

|  | Parts | Approx. Mol Ratio |
|---|---|---|
| Triethylsilane | 170 | 1 |
| Phenyllithium (in 715 parts diethyl ether) | 124 | 1 |

The above ingredients were reacted similarly as in Example 1 with the exception that the reflux time was 25 hours instead of 22 hours as in Example 1. The precipitate comprising lithium hydride which formed during the reaction was removed by filtration. The filtrate was diluted with 1000 parts water and the aqueous layer separated from the ether layer. The ether layer was washed with 1000 parts water and then dried over anhydrous sodium sulfate. The ether was removed by distillation and the remaining liquid was fractionally distilled to yield 228 parts triethylphenylsilane (approximately 81% of the theoretical yield) boiling at 236.5° C. at 762 mm., and having a refractive index and density at 26.3° C. of 1.4990 and 0.883, respectively.

Various substituted silanes that contain hydrogen may be employed in place of the triethylsilane used in the above examples. More specific examples are methylsilane ($CH_3SiH_3$), dimethylsilane [($CH_3$)$_2SiH_2$], trimethylsilane, ethylsilane, diethylsilane, tributylsilane, methylbutylsilane, methyldiethylsilane, diethylmethylsilane, methylethylsilane, isopropylsilane, isopropylmethylsilane, triisopropylsilane, methylphenylsilane, dimethylphenylsilane, ethylphenylsilane, ethyldiphenylsilane [($C_2H_5$)SiH($C_6H_5$)$_2$], triphenylsilane, phenylsilane ($C_6H_5SiH_3$), tritolylsilane, tribenzylsilane, etc.

It will be understood by those skilled in the art that other hydrocarbon-substituted lithium compounds may be employed in place of those used in the foregoing examples. Examples of such compounds include the alkyl-substituted lithiums, e. g., methyllithium, ethyllithium, isopropyllithium, isobutyllithium, hexyllithium, etc.; alkaryl-substituted lithiums, e. g., tolyllithium, etc.; aralkyl-substituted lithiums, e. g., benzyllithium, phenylethyllithium, ethylphenyllithium, etc.; aryl-substituted lithiums, e. g., naphthyllithium, etc.

By following the teachings of this invention, it is possible to introduce other organic groups besides monovalent hydrocarbon radicals into silicon compounds to replace a hydrogen attached to the silicon atom. For example, furyllithium or pyridyllithium may be reacted with triethylsilane in a suitable liquid medium, for instance, diethyl ether, to produce triethylfurylsilane or triethylpyridylsilane, respectively. Broadly, my invention may be used in many instances where it is desired to replace a hydrogen on a silicon atom with a monovalent hydrocarbon radical, more particularly, an alkyl, aryl, alkaryl, or an aralkyl radical.

What I claim as new and desire to secure by Letters Patent of the United States is:

1. The process which comprises effecting reaction under heat, in a liquid polar medium which is essentially inert to the reactants, between (1) a compound represented by the formula LiR and (2) a compound of the general formula $(R')_n SiH_{(4-n)}$ where R and R' are each a hydrocarbon radical selected from the class consisting of alkyl, aryl, aralkyl and alkaryl radicals, and $n$ is an integer which is at least 1 and not more than 3.

2. The method of preparing compounds corresponding to the general formula

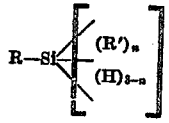

where R and R' are each a hydrocarbon radical selected from the class consisting of alkyl, aryl, alkaryl and aralkyl radicals, and $n$ is an integer which is at least 1 and not more than 3, which method comprises effecting reaction under heat, in the presence of a liquid polar medium which is essentially inert to the reactants, between (1) a compound represented by the formula LiR and (2) a compound of the general formula $(R')_n SiH_{(4-n)}$ where R, R' and $n$ each has the meaning stated above, and thereafter isolating compounds corresponding to the above formula from the reaction mass.

3. The process which comprises effecting reaction under heat between (1) a compound represented by the formula LiR and (2) a compound of the general formula $(R')_n SiH_{(4-n)}$ where R and R' are each a hydrocarbon radical selected from the class consisting of alkyl, aryl, alkaryl and aralkyl radicals, and $n$ is an integer which is at least 1 and not more than 3, said reaction being effected in the presence of a straight chain lower alkyl liquid ether.

4. A method as in claim 3 wherein the straight chain lower alkyl liquid ether is diethyl ether.

5. The method as in claim 1 wherein the compound represented by the formula LiR is an alkyl lithium and the liquid medium in which the reaction is effected is diethyl ether.

6. The method as in claim 1 wherein the compound represented by the formula LiR is an aryl lithium and the liquid medium in which the reaction is effected is diethyl ether.

7. The method of preparing triethylpropylsilane which comprises heating a mixture comprising propyllithium, triethylsilane and diethyl ether, and thereafter isolating triethylpropylsilane from the reaction mass.

8. The method of preparing triethylbutylsilane which comprises heating a mixture comprising butyllithium, triethylsilane and diethyl ether, and thereafter isolating triethylbutylsilane from the reaction mass.

9. The method of preparing triethylphenylsilane which comprises heating a mixture comprising phenyllithium, triethylsilane and diethyl ether, and thereafter isolating triethylphenylsilane from the reaction mass.

ROBERT N. MEALS.

REFERENCES CITED

The following references are of record in the file of this patent:

UNITED STATES PATENTS

| Number | Name | Date |
|---|---|---|
| 2,238,669 | Wiley | Apr. 15, 1941 |
| 2,386,452 | Fleming | Oct. 9, 1945 |
| 2,386,793 | Hanford | Oct. 16, 1945 |

OTHER REFERENCES

Kraus et al.: Journal of American Chemical Society 56 (1934), pages 195–202.